(12) United States Patent
Trusov et al.

(10) Patent No.: US 10,228,264 B2
(45) Date of Patent: Mar. 12, 2019

(54) SELF-CALIBRATION OF AN INERTIAL SYSTEM

(71) Applicants: Alexander Trusov, Woodland Hills, CA (US); Mark R. Phillips, Chardon, OH (US); George H. McCammon, Moorpark, CA (US)

(72) Inventors: Alexander Trusov, Woodland Hills, CA (US); Mark R. Phillips, Chardon, OH (US); George H. McCammon, Moorpark, CA (US)

(73) Assignee: NORTHROP GRUMMAN SYSTEMS CORPORATION, Falls Church, VA (US)

(*) Notice: Subject to any disclaimer, the term of this patent is extended or adjusted under 35 U.S.C. 154(b) by 58 days.

(21) Appl. No.: 15/256,168

(22) Filed: Sep. 2, 2016

(65) Prior Publication Data

US 2018/0066961 A1   Mar. 8, 2018

(51) Int. Cl.
*G01C 25/00* (2006.01)
*G01C 21/18* (2006.01)

(52) U.S. Cl.
CPC ............ *G01C 25/00* (2013.01); *G01C 21/18* (2013.01); *G01C 25/005* (2013.01)

(58) Field of Classification Search
None
See application file for complete search history.

(56) References Cited

U.S. PATENT DOCUMENTS 3,782,167 A * 1/1974 Stuelpnagel ............ G01C 21/16
                                                          73/1.77
6,189,382 B1 * 2/2001 Johnson .............. G01C 19/5691
                                                          73/504.13
(Continued)

FOREIGN PATENT DOCUMENTS

DE    102008041451 A1   2/2010
DE    102012219507 A1   4/2014
(Continued)

OTHER PUBLICATIONS

European Search Report corresponding to European Application No. 17001442.7, dated Feb. 22, 2018, pp. 1-11.
(Continued)

*Primary Examiner* — Redhwan K Mawari
*Assistant Examiner* — Edward Torchinsky
(74) *Attorney, Agent, or Firm* — Tarolli, Sundheim, Covell & Tummino LLP (57) ABSTRACT

One embodiment describes an inertial system. The system includes a gyroscope system comprising a plurality of gyroscopes. The gyroscope system can be configured to provide rotation rate data associated with rotation of the plurality of gyroscopes about a respective plurality of sensitive axes. The system also includes a rotation sensor system configured to calculate navigation data based on the rotation rate data. The rotation sensor system includes a self-calibration component configured to designate a first gyroscope of the plurality of gyroscopes for self-calibration during operation of the inertial system and to inject a (Continued)

calibration input signal into the first gyroscope. The self-calibration component being configured to calibrate the first gyroscope based on the rotation rate data of the first gyroscope corresponding to the calibration input signal relative to the rotation rate data associated with a remaining at least one of the plurality of gyroscopes.

16 Claims, 3 Drawing Sheets

(56) References Cited

U.S. PATENT DOCUMENTS

| | | | |
|---|---|---|---|
| 6,209,383 B1 * | 4/2001 | Mueller | G01C 19/72 |
| | | | 73/1.37 |
| 6,598,455 B1 | 7/2003 | Gutierrez et al. | |
| 9,671,247 B2 * | 6/2017 | Okon | G01C 25/00 |
| 9,927,256 B2 * | 3/2018 | Rosellini | G01C 25/00 |
| 2010/0063763 A1 | 3/2010 | Rozelle | |
| 2011/0066395 A1 * | 3/2011 | Judd | G01C 19/56 |
| | | | 702/104 |
| 2015/0377625 A1 | 12/2015 | Aaltonen | |
| 2016/0018243 A1 * | 1/2016 | Okon | G01C 25/00 |
| | | | 73/1.77 |
| 2018/0031373 A1 * | 2/2018 | Trusov | G01C 19/574 |

FOREIGN PATENT DOCUMENTS

| | | |
|---|---|---|
| EP | 2356404 A1 | 8/2011 |
| EP | 2778609 A1 | 9/2014 |
| EP | 2952854 A1 | 12/2015 |
| JP | 2010066254 A | 3/2010 |
| JP | 2011506991 A | 3/2011 |
| JP | 2016029366 A | 3/2016 |

OTHER PUBLICATIONS

Japanese Office Action corresponding to Japanese Patent Application No. 2017-162126 dated Aug. 28, 2018.

* cited by examiner

SELF-CALIBRATION OF AN INERTIAL SYSTEM

TECHNICAL FIELD

The present disclosure relates generally to sensor systems, and specifically to self-calibration of an inertial system.

BACKGROUND

Inertial sensing systems can be implemented in a variety of applications, such as for navigation (e.g., aeronautical navigation). Examples of inertial sensing instruments can include gyroscopes, magnetometers, and/or a combination thereof. Scale-factor and bias error can be major sources of error in inertial measurement and/or navigation systems. Bias error can arise due to transient behavior at turn on, non-modelability, and instability of bias versus temperature characteristics including hysteresis and can simply trend over time. Mitigation of scale-factor and bias error in inertial sensing devices, particularly in a dynamic environment, could significantly improve the performance of inertial measurement and navigation systems.

SUMMARY

One embodiment describes an inertial system. The system includes a gyroscope system comprising a plurality of gyroscopes. The gyroscope system can be configured to provide rotation rate data associated with rotation of the plurality of gyroscopes about a respective plurality of sensitive axes. The system also includes a rotation sensor system configured to calculate navigation data based on the rotation rate data. The rotation sensor system includes a self-calibration component configured to designate a first gyroscope of the plurality of gyroscopes for self-calibration during operation of the inertial system and to inject a calibration input signal into the first gyroscope. The self-calibration component being configured to calibrate the first gyroscope based on the rotation rate data of the first gyroscope corresponding to the calibration input signal relative to the rotation rate data associated with a remaining at least one of the plurality of gyroscopes.

Another embodiment includes a method for calibrating an inertial system comprising a plurality of gyroscopes. The method includes selecting a first gyroscope of a plurality of gyroscopes to implement a calibration procedure and injecting a calibration input signal comprising predetermined signal characteristics into the first gyroscope. The method also includes receiving rotation rate data associated with each of the plurality of gyroscopes corresponding to real-time rotation about a respective plurality of axes and generating a scale-factor estimate based on the rotation rate data associated with the first gyroscope. The method further includes demodulating the received rotation rate data associated with each of the plurality of gyroscopes based on the predetermined signal characteristics of the calibration input signal and updating a scale-factor associated with the first gyroscope with the scale-factor estimate based on the demodulated rotation rate data.

Another embodiment includes an inertial system. The system includes a gyroscope system comprising a plurality of gyroscopes. The gyroscope system can be configured to provide output signals associated with rotation of the plurality of gyroscopes about a respective plurality of sensitive axes. The system also includes a rotation sensor system. The rotation sensor system includes a signal processor configured to generate rotation rate data based on the output signals and to generate a scale-factor estimate for a first gyroscope of the plurality of gyroscopes based on a calibration input signal that is injected into the first gyroscope during a calibration procedure associated with the first gyroscope during normal operating conditions of the inertial system. The rotation sensor system further includes an inertial measurement unit (IMU) configured to generate navigation data based on the rotation rate data, the IMU comprising a self-calibration component configured to generate the calibration input signal and to calibrate a scale-factor of the first gyroscope based on the rotation rate data of the first gyroscope corresponding to the scale-factor estimate relative to the rotation rate data associated with a remaining at least one of the plurality of gyroscopes.

DETAILED DESCRIPTION

The present disclosure relates generally to sensor systems, and specifically to self-calibration of an inertial system. An inertial system can include a gyroscope system and a rotation sensor system that is configured to generate navigation data corresponding to motion in three-dimensional space (e.g., yaw, pitch, and roll). The gyroscope system can include a plurality of gyroscopes, such as nuclear magnetic resonance (NMR) gyroscopes, hemispherical resonator gyroscopes (HRG), Coriolis vibratory gyroscope (CVG), or a variety of other types of gyroscopes. The rotation sensor system includes a signal processor that is configured to convert output signals provided from the gyroscope system to rotation rate data associated with rotation of the gyroscopes about respective sensitive axes. The rotation sensor also includes a scale-factor estimator configured to generate a scale-factor estimate for one of the gyroscopes for which a calibration procedure is being conducted.

The rotation sensor system also includes an inertial measurement unit (IMU) processor that is configured to calculate the navigation data based on a scale-factor and a thermal model associated with the gyroscopes. Additionally, the IMU processor includes a self-calibration component configured to designate a given one of the gyroscopes at a time as a first gyroscope for a calibration procedure during normal operating conditions of the inertial system. During a calibration procedure, the self-calibration component can inject a calibration input signal having predetermined signal characteristics (e.g., a frequency and amplitude profile) into the first gyroscope, such that the scale-factor estimator can generate the scale-factor estimate corresponding to the rotation rate data of the first gyroscope based on the calibration input signal. The self-calibration component can thus demodulate the rotation rate data of the gyroscopes based on the predetermined signal characteristics of the calibration input signal and can analyze a power spectral density (PSD). The self-calibration component can thus calibrate a scale-factor of the first gyroscope based on the analysis of the PSD.

For example, the self-calibration component can be configured to generate a figure of merit (FOM) based on the analysis of the PSD, with the FOM corresponding to a metric that can quantify contamination of the scale-factor estimate from dynamic motion, as defined by the rotation rate data of the remaining at least one gyroscope, during the self-calibration procedure. The self-calibration component can thus compare the FOM with a predetermined threshold to determine if the scale-factor estimate is acceptable. If the scale-factor estimate is considered acceptable, such as based on the FOM being above the predetermined threshold, the self-calibration component can update the scale-factor of the first gyroscope, as well as a thermal model, with the scale-factor estimate. If the scale-factor estimate is considered unacceptable, such as based on the FOM being below the predetermined threshold, the self-calibration component can iteratively change the calibration input signal and iteratively repeat the self-calibration procedure until the updated FOM is acceptable, or until a predetermined number of iterations is achieved, causing the self-calibration procedure to cease for the first gyroscope.

Figure 1:
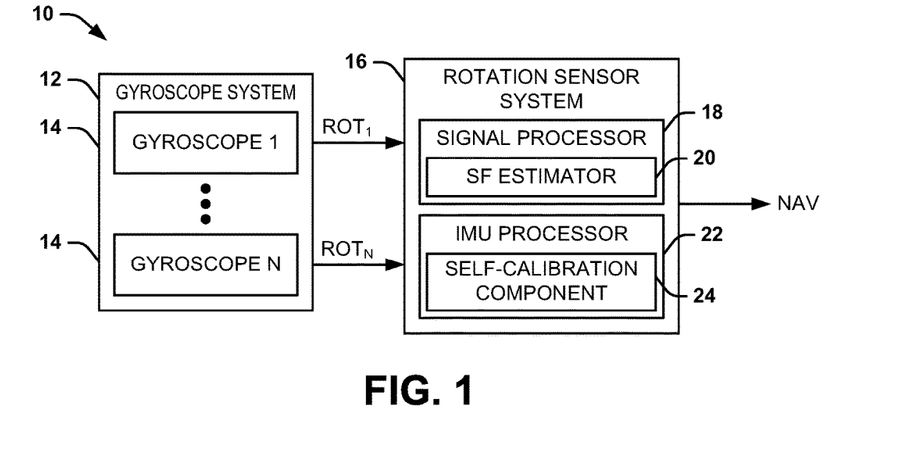
FIG. 1 illustrates an example of an inertial system.

FIG. 1 illustrates an example of an inertial system 10. The inertial system 10 can be implemented in a variety of applications requiring the calculation of motion data, such as in aircraft or spacecraft avionics, guidance systems, nautical applications, and/or a variety of other navigation systems. The inertial system 10 is configured to calculate navigation data associated with motion of the inertial system 10 (e.g., yaw, pitch, and roll), demonstrated in the example of FIG. 1 as a signal NAV. As an example, the motion that is measured and calculated by the inertial system 10 can include an acceleration of the inertial system 10 and/or can include a rotation of the inertial system 10 about three orthogonal axes.

The inertial system 10 includes a gyroscope system 12 that includes a plurality N of gyroscopes 14, where N is a positive integer greater than one. The gyroscopes 14 are each configured to generate an output signal ROT, demonstrated respectively as output signals $ROT_1$ through $ROT_N$, corresponding to rotation about each of a respective plurality of sensitive axes. As an example, the gyroscope system 12 can include four gyroscopes, as depicted in the example of FIG. 2.

Figure 2:
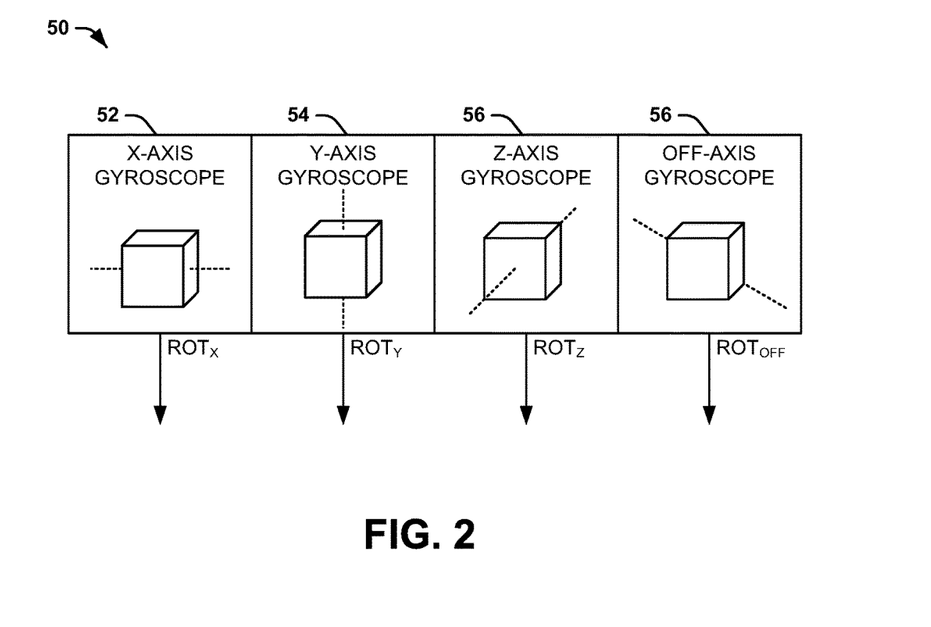
FIG. 2 illustrates an example of a gyroscope system.

FIG. 2 illustrates an example of a gyroscope system 50. The gyroscope system 50 can correspond to the gyroscope system 12 in the example of FIG. 1. The gyroscope system 50 includes an X-axis gyroscope 52 that is configured to generate an output signal $ROT_X$ corresponding to rotation of the gyroscope system 50 about the X-axis in Cartesian coordinate space. The gyroscope system 50 also includes a Y-axis gyroscope 54 that is configured to generate an output signal $ROT_Y$ corresponding to rotation of the gyroscope system 50 about the Y-axis in Cartesian coordinate space. The gyroscope system 50 also includes a Z-axis gyroscope 56 that is configured to generate an output signal $ROT_Z$ corresponding to rotation of the gyroscope system 50 about the Z-axis in Cartesian coordinate space. The gyroscope system 50 further includes an off-axis gyroscope 58 that is configured to generate an output signal $ROT_{OFF}$ corresponding to rotation of the gyroscope system 50 about an axis that is skewed with respect to the X-axis, the Y-axis, and the Z-axis.

As described in greater detail herein, one of the gyroscopes 52, 54, 56, and 58 can be designated for a calibration procedure at a given time during normal operating conditions of the inertial system 10 based on the inclusion of the off-axis gyroscope 58. For example, the sensitive axis of the off-axis gyroscope 58 can have a predetermined angular relationship with respect to the X-axis, the Y-axis, and the Z-axis. Therefore, the off-axis gyroscope 58 can be implemented to monitor rotational motion of the gyroscope system 50 during calibration of, and thus in place of, one of the X-axis gyroscope 52, the Y-axis gyroscope 54, and the Z-axis gyroscope 56 based on the predetermined angular relationship of the sensitive axis of the off-axis gyroscope 58 with respect to the X-axis, the Y-axis, and the Z-axis.

Referring back to the example of FIG. 1, the inertial system 10 also includes a rotation sensor system 16 that is configured to generate the navigation data NAV based on the output signals $ROT_1$ through $ROT_N$. The rotation sensor system 16 includes a signal processor 18 that is configured to process the output signals $ROT_1$ through $ROT_N$ to generate rotation rate data corresponding to the rotation of the gyroscope system 12 about the respective sensitive axes. In the example of FIG. 1, the signal processor 18 also includes a scale-factor estimator 20 that is configured to generate a scale-factor estimate based on the output signal ROT provided from the respective one of the gyroscopes 14 on which the calibration procedure is being performed. As an example, the scale-factor estimate can be generated via the scale-factor estimator 20 based on a calibration input signal that is injected into the respective one of the gyroscopes 14, such as based on a ratio of the output signal ROT relative to the calibration input signal provided to the respective gyroscope 14.

The rotation sensor system 16 also includes an inertial measurement unit (IMU) processor 22 that is configured to calculate the navigation data NAV based on the rotation rate data of the gyroscopes 14. For example, the IMU processor 22 can calculate the navigation data NAV based on the rotation rate data of the gyroscopes 14 and based on at least one scale-factor and a thermal model associated with the gyroscopes 14. In addition, the IMU processor 22 includes a self-calibration component 24 that is configured to control the self-calibration procedure of the gyroscopes 14. As an example, the self-calibration component 24 can be configured to periodically initiate a self-calibration procedure on each of the gyroscopes 14 in a sequence during normal operation of the inertial system 10. The self-calibration component 24 can generate the calibration input signal that is injected into the respective one of the gyroscopes 14 during the calibration procedure, and can analyze the rotation rate data of the respective one of the gyroscopes 14 relative to the rotation rate data associated with the remaining one or more of the gyroscopes 14 to calibrate the scale-factor of the given one of the gyroscopes 14.

For example, during a calibration procedure, the self-calibration component 24 can generate the calibration input signal to have predetermined signal characteristics (e.g., a frequency and amplitude profile). The calibration input signal can thus be injected into the respective gyroscope 14, such that the scale-factor estimator 20 can generate the scale-factor estimate corresponding to the rotation rate data of the respective gyroscope 14 based on the calibration input signal. As an example, the self-calibration component 24 can demodulate the rotation rate data of the gyroscopes 14 based on the predetermined signal characteristics of the calibration input signal and can analyze a power spectral density (PSD) corresponding to the demodulated rotation rate data of the gyroscopes 14. The self-calibration component 24 can thus calibrate a scale-factor of the respective gyroscope 14 based on the analysis of the PSD.

As an example, the self-calibration component 24 can be configured to generate a figure of merit (FOM) based on the analysis of the PSD. The FOM can correspond to a metric that can quantify contamination of the scale-factor estimate from dynamic motion of the gyroscope system 12, such as defined by the rotation rate data of the remaining at least one of the gyroscopes 14, during the self-calibration procedure. The self-calibration component 24 can thus compare the FOM with a predetermined threshold to determine if the scale-factor estimate is acceptable. For example, the self-calibration component 24 can determine that the scale-factor estimate is considered acceptable based on the FOM being above the predetermined threshold. In response to an acceptable scale-factor estimate, the self-calibration component 24 can update the scale-factor of the respective gyroscope 14 with the scale-factor estimate. Conversely, the self-calibration component 24 can determine that the scale-factor estimate is considered unacceptable based on the FOM being below the predetermined threshold. In response to an unacceptable scale-factor estimate, the self-calibration component 24 can iteratively repeat the self-calibration procedure until the updated FOM is acceptable. For example, at each iteration, the self-calibration component 24 can adjust the signal characteristics of the calibration input signal, provide the adjusted calibration input signal to the respective gyroscope 14, receive an updated scale-factor estimate from the signal processor 18, demodulate the rotation rate data of the gyroscopes 14, analyze the resultant PSD of the demodulated rotation rate data, and generate another FOM. The self-calibration component 24 can thus continue to iteratively generate an FOM until the FOM is considered acceptable, or until a predetermined number of iterations is achieved, causing the self-calibration procedure to cease for the respective gyroscope 14. The self-calibration component 24 can thus either wait to attempt a self-calibration procedure of the respective gyroscope 14 at a later time, or can initiate a self-calibration procedure on a next one of the gyroscopes 14 in the sequence.

As a result, the self-calibration component 24 can calibrate the gyroscope system 12 in real-time during normal operating conditions of the inertial system 10 in a manner that substantially mitigates contamination of the calibration input signal by actual inertial motion of the gyroscope system 12. Thus, the self-calibration component 24 can facilitate accurate scale-factor calibration of the gyroscope system 12 that substantially mitigates errors during calibration procedures occurring in dynamic flight and/or during dynamic thermal environment conditions. Accordingly, the self-calibration component 24 can thus separate dynamic true inertial input parameters from predetermined calibration input parameters for a more accurate scale-factor calibration.

Figure 3:
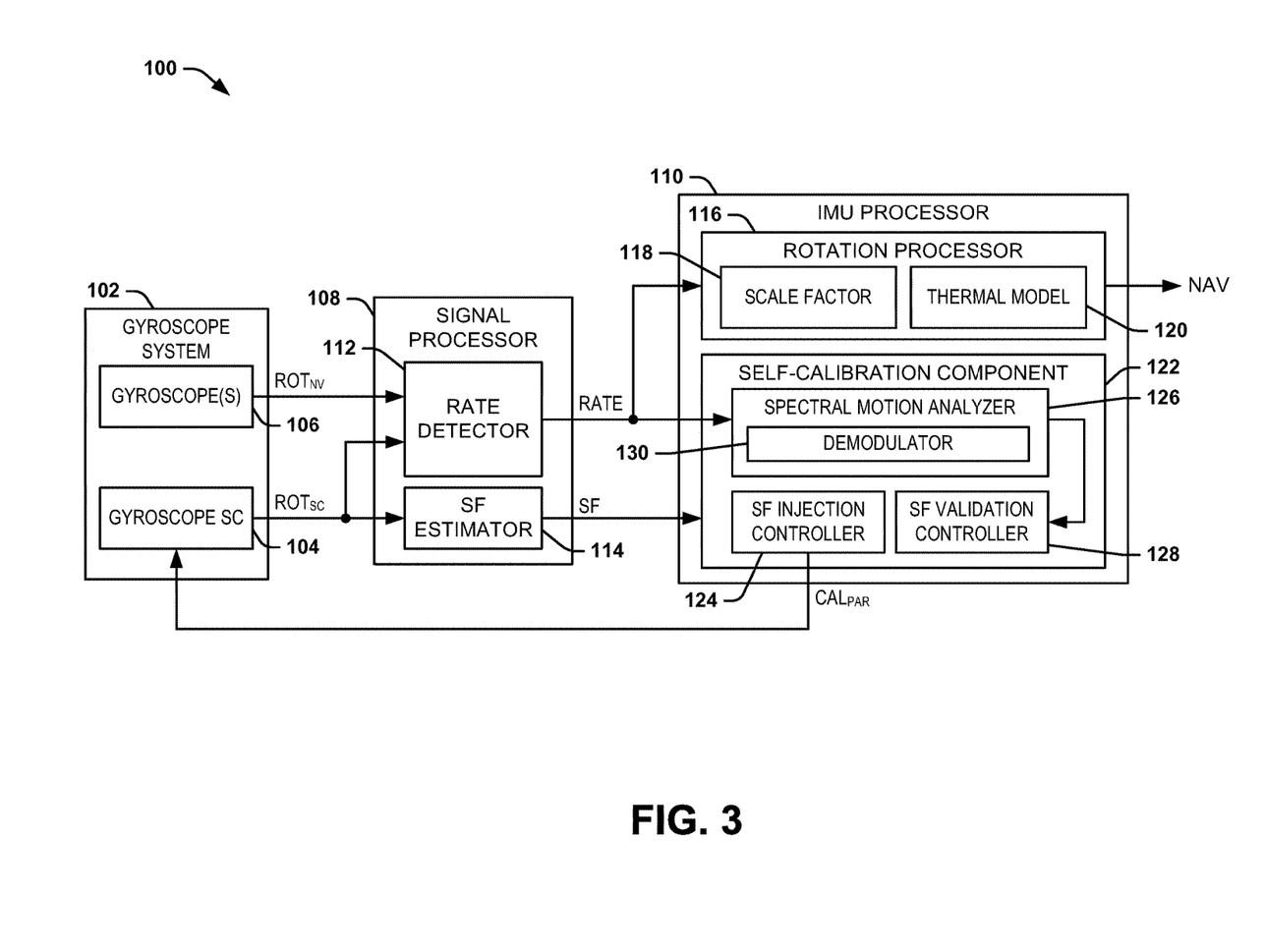
FIG. 3 illustrates another example of an inertial system.

FIG. 3 illustrates another example of an inertial system 100. Similar to as described previously, the inertial system 100 is configured to calculate navigation data associated with motion of the inertial system 100 (e.g., yaw, pitch, and roll), demonstrated in the example of FIG. 3 as a signal NAV. As an example, the motion that is measured and calculated by the inertial system 100 can include a rotation of the inertial system 100 about at least one axis, such as three orthogonal axes.

The inertial system 100 includes a gyroscope system 102 that includes a plurality of gyroscopes. As an example, the gyroscope system 102 can include four gyroscopes, such as demonstrated in the example of FIG. 2. The plurality of gyroscopes are demonstrated in the example of FIG. 3 as a first gyroscope 104, depicted as "GYROSCOPE SC", and at least one additional gyroscope 106, depicted as "GYROSCOPE(S)". In the example of FIG. 3, the first gyroscope 104 generates an output signal $ROT_{SC}$ and the gyroscope(s) 106 generate respective output signal(s) $ROT_{NV}$ corresponding to rotation about one or more respective sensitive axes. The first gyroscope 104 thus corresponds to one of the collective plurality of gyroscopes for which a self-calibration procedure is being implemented at a given time, while the gyroscope(s) 106 are configured to measure rotation of the gyroscope system 102 in real-time under normal operating conditions while the first gyroscope 104 is undergoing self-calibration. Thus, at a later time, the first gyroscope 104 measures rotation of the gyroscope system 102 in real-time under normal operating conditions, and one of the other gyroscope(s) 106 is selected for self-calibration to become the first gyroscope 104. Accordingly, the first gyroscope 104 and the gyroscope(s) 106 sequentially perform the self-calibration procedure.

The inertial system 100 also includes a signal processor 108 and an IMU processor 110. The signal processor 108 and the IMU processor 110 can, for example, collectively correspond to the rotation sensor system 16 in the example of FIG. 1. The signal processor 108 includes a rate detector 112 and a scale-factor estimator 114. The rate detector 112 is configured to process the output signals $ROT_{NV}$ and $ROT_{SC}$ to generate rotation rate data, demonstrated in the example of FIG. 3 as a signal RATE, corresponding to the rotation of the gyroscope system 102 about the respective sensitive axes. The scale-factor estimator 114 is configured to generate a scale-factor estimate, demonstrated in the example of FIG. 3 as a signal SF, based on the output signal $ROT_{SC}$ provided from the first gyroscope 104. As an example, the scale-factor estimate can be generated via the scale-factor estimator 114 based on a calibration input signal $CAL_{PAR}$ that is injected into the first gyroscope 104, such as based on a ratio of the output signal $ROT_{SC}$ relative to the calibration input signal $CAL_{PAR}$ provided to the first gyroscope 104.

The IMU processor 110 includes a rotation processor 116 that is configured to calculate the navigation data NAV based on the rotation rate data RATE associated with the gyroscope(s) 106 and based on at least one scale-factor 118 and a thermal model 120 associated with the gyroscope system 102. As an example, the scale-factor 118 can be individual with respect to each of the gyroscope(s) 106, and can be adjusted based on the temperature-based thermal model 120. In addition, the IMU processor 110 includes a self-calibration component 122 that is configured to control the self-calibration procedure of the gyroscopes 104. As an example, the self-calibration component 122 can be configured to periodically initiate a self-calibration procedure on each of the gyroscopes in the gyroscope system 102 in a sequence during normal operation of the inertial system 100.

The self-calibration component 122 includes a scale-factor injection controller 124 that is configured to select a given one of the gyroscopes in the gyroscope system 102 to be the first gyroscope 104 on which a calibration procedure is to be performed. The scale-factor injection controller 124 can generate the calibration input signal $CAL_{PAR}$ that is injected into the first gyroscope 104 during the calibration procedure. The scale-factor injection controller 124 can generate the calibration input signal to have predetermined signal characteristics, such as a frequency and amplitude profile. Therefore, the scale-factor estimator 114 can generate the scale-factor estimate SF based on the signal characteristics of the calibration input signal $CAL_{PAR}$, as exhibited in the output signal $ROT_{SC}$ provided from the first gyroscope 104.

In the example of FIG. 3, the self-calibration component 122 also includes a spectral motion analyzer 126 and a scale-factor validation controller 128. The spectral motion analyzer 126 is configured to demodulate the demodulate the rotation rate data RATE of the first gyroscope 104 and the gyroscope(s) 106 based on the predetermined signal characteristics of the calibration input signal $CAL_{PAR}$ via a demodulator 130. The spectral motion analyzer 126 can thus analyze a PSD corresponding to the demodulated rotation rate data RATE of the first gyroscope 104 and the gyroscope(s) 106. For example, the PSD can correspond to an amplitude demodulated time-history of the rotation rate data RATE of the first gyroscope 104 and the gyroscope(s) 106 projected onto the sensitive axis of the first gyroscope 104. The analysis of the PSD via the spectral motion analyzer 126 can thus be such that the spectral motion analyzer 126 determines if dynamic motion of the gyroscope system 102, as determined by the rotation rate data RATE associated with the gyroscope(s) 106, affects the rotation rate data RATE of the first gyroscope 104 at the frequency associated with the calibration input signal $CAL_{PAR}$.

In response to the analysis of the PSD, the scale-factor validation controller 128 is configured to generate an FOM that corresponds to a metric that quantifies the contamination of the scale-factor estimate SF from the dynamic motion of the gyroscope system 102 during the self-calibration procedure. The scale-factor validation controller 128 is thus configured to compare the FOM with a predetermined threshold to determine if the scale-factor estimate SF is acceptable. For example, the scale-factor validation controller 128 can determine that the scale-factor estimate is considered acceptable based on the FOM being above the predetermined threshold. In response to an acceptable scale-factor estimate, the self-calibration component 122 can update the scale-factor 118 of the first gyroscope 104 with the scale-factor estimate SF. The self-calibration component 122 can also, as an example, update the thermal model 120 of the gyroscope system 102 based on the scale-factor estimate SF.

As another example, the scale-factor validation controller 128 can determine that the scale-factor estimate SF is considered unacceptable based on the FOM being below the predetermined threshold. In response to an unacceptable scale-factor estimate, the self-calibration component 122 can iteratively repeat the self-calibration procedure until the updated FOM is acceptable. For example, at each iteration, the scale-factor validation controller 128 can command the scale-factor injection controller 124 to adjust the signal characteristics of the calibration input signal $CAL_{PAR}$ and to provide the adjusted calibration input signal $CAL_{PAR}$ to the first gyroscope 104. In response to the adjusted calibration input signal $CAL_{PAR}$, the scale-factor estimator 114 is configured to generate an updated scale-factor estimate SF at each iteration based on the adjusted signal characteristics of the calibration input signal $CAL_{PAR}$, as exhibited in the output signal $ROT_{SC}$ provided from the first gyroscope 104. The spectral motion analyzer 126 can thus demodulate the rotation rate data RATE of the of the first gyroscope 104 and the gyroscope(s) 106 via the demodulator 130 at each iteration, such that the scale-factor validation controller 128 can analyze the resultant PSD of the demodulated rotation rate data RATE and generate another FOM. The scale-factor validation controller 128 can thus continue to iteratively generate an FOM until the FOM is considered acceptable, or until a predetermined number of iterations is achieved. In response to achieving an iteration count value that is equal to the predetermined number of iterations, the self-calibration component 122 can cease the self-calibration procedure for the first gyroscope 104. The self-calibration component 122 can thus either wait to attempt a self-calibration procedure of the first gyroscope 104 at a later time, or can initiate a self-calibration procedure on one of the gyroscope(s) 106 that is next in the sequence.

Figure 4:
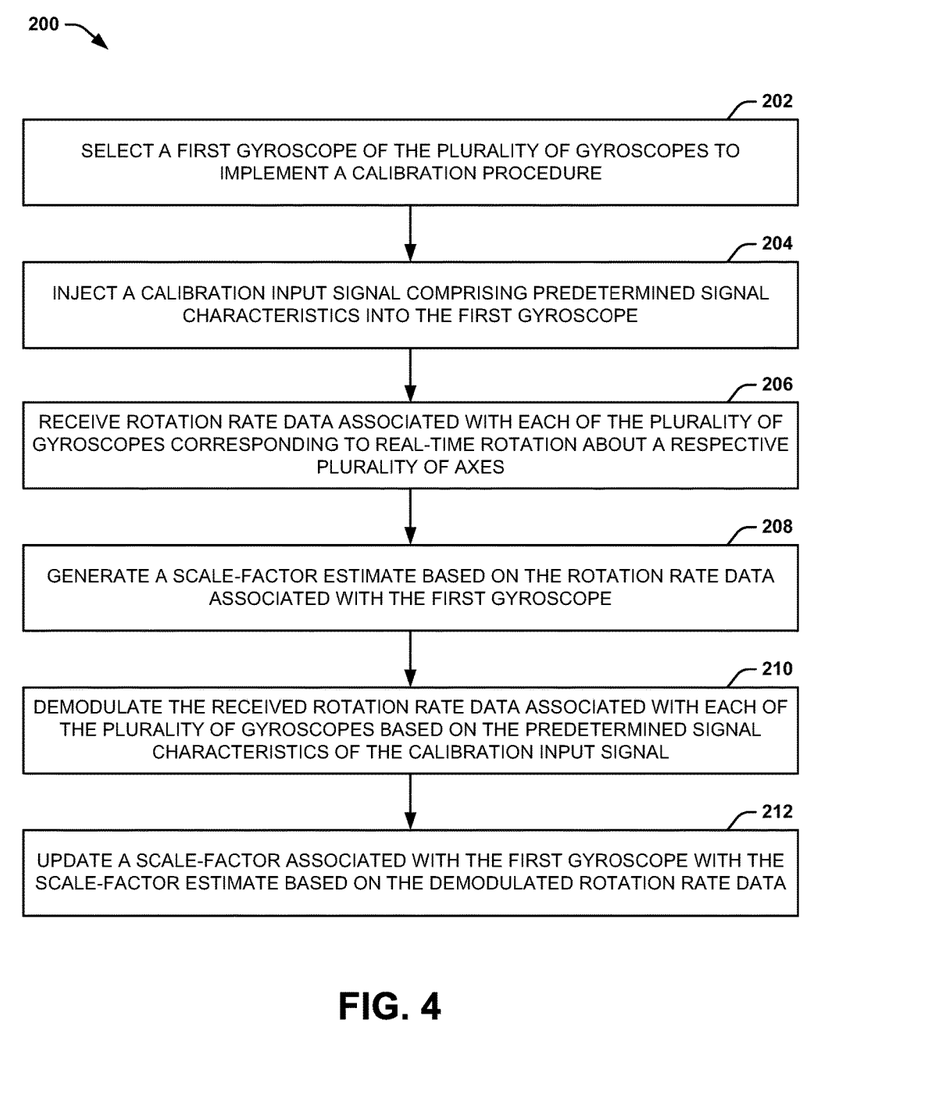
FIG. 4 illustrates an example of a method for calibrating a gyroscope system.

In view of the foregoing structural and functional features described above, a methodology in accordance with various aspects of the present invention will be better appreciated with reference to FIG. 4. While, for purposes of simplicity of explanation, the methodology of FIG. 4 is shown and described as executing serially, it is to be understood and appreciated that the present invention is not limited by the illustrated order, as some aspects could, in accordance with the present invention, occur in different orders and/or concurrently with other aspects from that shown and described herein. Moreover, not all illustrated features may be required to implement a methodology in accordance with an aspect of the present invention.

FIG. 4 illustrates an example of a method 200 for calibrating an inertial system comprising a plurality of gyroscopes (e.g., the gyroscopes 14). At 202, a first gyroscope (e.g., the first gyroscope 104) of the plurality of gyroscopes is selected to implement a calibration procedure. At 204, a calibration input signal (e.g., the calibration input signal $CAL_{PAR}$) comprising predetermined signal characteristics is injected into the first gyroscope. At 206, rotation rate data (e.g., the rotation rate data RATE) associated with each of the plurality of gyroscopes corresponding to real-time rotation about a respective plurality of axes is received. At 208, a scale-factor estimate (e.g., the scale-factor estimate SF) is generated based on the rotation rate data associated with the first gyroscope. At 210, the received rotation rate data associated with each of the plurality of gyroscopes is demodulated based on the predetermined signal characteristics of the calibration input signal. At 212, a scale-factor (e.g., the scale-factor 118) associated with the first gyroscope is updated with the scale-factor estimate based on the demodulated rotation rate data.

What have been described above are examples of the invention. It is, of course, not possible to describe every conceivable combination of components or methodologies for purposes of describing the invention, but one of ordinary skill in the art will recognize that many further combinations and permutations of the invention are possible. Accordingly, the invention is intended to embrace all such alterations, modifications, and variations that fall within the scope of this application, including the appended claims. Additionally, where the disclosure or claims recite "a," "an," "a first," or "another" element, or the equivalent thereof, it should be interpreted to include one or more than one such element, neither requiring nor excluding two or more such elements. As used herein, the term "includes" means includes but not limited to, and the term "including" means including but not limited to. The term "based on" means based at least in part on.

What is claimed is:

1. An inertial system comprising:
 a gyroscope system comprising a plurality of gyroscopes, the gyroscope system to provide rotation rate data associated with a rotation of each of the plurality of gyroscopes about a respective sensitive axis of each of the plurality of gyroscopes; and
 a rotation sensor system comprises a signal processor, the rotation sensor system to calculate navigation data based on the rotation rate data, the rotation sensor system comprising a self-calibration component that comprises a scale-factor injection controller to designate a first gyroscope of the plurality of gyroscopes for self-calibration during operation of the inertial system and to inject a feedback calibration input signal from the scale-factor injection controller into the first gyroscope and to calibrate the first gyroscope based on the rotation rate data of the first gyroscope corresponding to the calibration input signal relative to the rotation rate data associated with a remaining at least one of the plurality of gyroscopes, the self-calibration component further comprising a scale-factor validation controller to calculate a figure of merit (FOM) that defines a quantifiable contamination associated with a scale-factor estimate based on a dynamic motion of the gyroscope system.

2. The system of claim 1, wherein the signal processor generates the scale-factor estimate for the first gyroscope based on the calibration input signal, wherein the scale-factor validation controller calculates the FOM associated with the scale-factor estimate based on the rotation rate data of the first gyroscope corresponding to the calibration input signal relative to the rotation rate data associated with a remaining at least one of the plurality of gyroscopes, and wherein the scale-factor validation controller calibrates a scale-factor associated with the first gyroscope based on the FOM.

3. The system of claim 2, wherein the self-calibration component further comprises a spectral motion analyzer comprising a demodulator to amplitude demodulate the rotation rate data associated with the plurality of gyroscopes based on at least one signal characteristic associated with the calibration input signal and to generate the FOM based on analyzing a power spectral density (PSD) associated with the demodulated rotation rate data associated with the plurality of gyroscopes.

4. The system of claim 2, wherein the scale-factor validation controller compares the FOM to a predetermined threshold to determine if the FOM is acceptable, and is further configured to update the scale-factor associated with the first gyroscope in response to the scale-factor validation controller determining that the FOM is acceptable, and to adjust the calibration input signal in an iterative feedback manner to generate an updated scale-factor estimate and to calculate an updated FOM based on the updated scale-factor estimate in the iterative feedback manner in response to the scale-factor validation controller determining that the FOM is unacceptable.

5. The system of claim 4, wherein the scale-factor validation controller is configured to continuously adjust the calibration input signal in the iterative feedback manner in response to determining that the FOM is unacceptable for a predetermined number of iterations, and is further configured to cease the calibration of the first gyroscope in response to achieving the predetermined number of iterations.

6. The system of claim 4, wherein the self-calibration component is further configured to update a thermal model associated with the plurality of gyroscopes in response to determining that the FOM is acceptable.

7. The system of claim 1, wherein the scale-factor injection controller injects the calibration input signal comprising a predetermined signal profile having a predetermined frequency and a predetermined amplitude, wherein the self-calibration component comprises a spectral motion analyzer to analyze a power spectral density (PSD) associated with the rotation rate data associated with the plurality of gyroscopes, the scale-factor injection controller calibrates the first gyroscope based on the predetermined frequency of the calibration input signal associated with the rotation rate data of the first gyroscope in the PSD relative to the rotation rate data associated with a remaining at least one of the plurality of gyroscopes in the PSD.

8. The system of claim 7, wherein the spectral motion analyzer amplitude demodulates the rotation rate data of the first gyroscope based on the predetermined frequency to determine if the self-calibration of the first gyroscope is sufficient based on the PSD of the rotation rate data associated with the remaining at least one of the plurality of gyroscopes.

9. The system of claim 1, wherein the scale-factor injection controller injects the calibration input signal comprising a first predetermined signal profile corresponding to simulated rotation of the first gyroscope in a first angular direction about the corresponding one of the plurality of sensitive axes, and injects the calibration input signal comprising a second predetermined signal profile corresponding to a simulated rotation of the first gyroscope in a second angular direction about the corresponding one of the plurality of sensitive axes.

10. The system of claim 1, wherein the gyroscope system comprises:
a first gyroscope to provide rotation rate frequency data associated with a first axis;
a second gyroscope to provide rotation rate frequency data associated with a second axis that is orthogonal with respect to the first axis;
a third gyroscope to provide rotation rate frequency data associated with a third axis that is orthogonal with respect to both the first and second axes; and
a fourth gyroscope to provide rotation rate frequency data associated with a fourth axis that is non-coplanar with respect to the first, second, and third axes.

11. A method for calibrating an inertial system comprising a plurality of gyroscopes, the method comprising:
providing a gyroscope system including the plurality of gyroscopes and a signal processor;
selecting a first gyroscope of the plurality of gyroscopes to implement a calibration procedure;
injecting a calibration input signal comprising predetermined signal characteristics into the first gyroscope;
receiving rotation rate data associated with each of the plurality of gyroscopes corresponding to real-time rotation about a respective axis of each of the plurality of gyroscopes;
generating a scale-factor estimate by the signal processor based on a ratio of an output signal of the rotation rate data associated with the first gyroscope to the calibration input signal provided to the first gyroscope;
amplitude demodulating the received rotation rate data associated with each of the plurality of gyroscopes based on the predetermined signal characteristics of the calibration input signal; and
updating a scale-factor associated with the first gyroscope with the scale-factor estimate based on the demodulated rotation rate data.

12. The method of claim 11, wherein prior to updating a scale-factor, the method further comprising:
generating a figure of merit (FOM) that defines a quantifiable contamination associated with the scale-factor estimate based on the demodulated rotation rate data; and
comparing the FOM with a predetermined threshold to determine if the FOM is acceptable, wherein updating the scale-factor comprises updating the scale-factor with the scale-factor estimate in response to determining that the FOM is acceptable.

13. The method of claim 12, further comprising:
adjusting the calibration input signal in response to determining that the FOM is unacceptable;
generating an updated FOM based on the demodulated rotation rate data corresponding to the adjusted calibration input signal; and
comparing the updated FOM with the predetermined threshold to determine if the updated FOM is acceptable.

14. The method of claim 13, wherein adjusting the calibration, generating the updated FOM, and comparing the updated FOM comprises adjusting the calibration, generating the updated FOM, and comparing the updated FOM in an iterative manner, the method further comprising:
incrementing a counter at each iteration of the iterative manner;
comparing a count value associated with the counter with a predetermined count threshold; and
ceasing the calibration procedure of the first gyroscope in response to the count value being equal to the predetermined count threshold.

15. The method of claim 11, further comprising updating a thermal model associated with the plurality of gyroscopes in response to updating the scale-factor.

16. The method of claim 11, wherein the predetermined signal characteristics comprise frequency and amplitude, wherein demodulating the received rotation rate data comprises amplitude demodulating the received rotation rate data associated with the plurality of gyroscopes based on the frequency, the method further comprising analyzing a power spectral density (PSD) associated with the demodulated rotation rate data associated with the plurality of gyroscopes, wherein updating the scale-factor comprises updating the scale-factor associated with the first gyroscope with the scale-factor estimate in response to determining that the rotation rate data associated with the first gyroscope is substantially unaffected by the rotation rate data associated with a remaining at least one of the plurality of gyroscopes at the frequency based on the PSD.

* * * * *